US007876350B2

(12) United States Patent
Shin et al.

(10) Patent No.: US 7,876,350 B2
(45) Date of Patent: Jan. 25, 2011

(54) THREE-DIMENSIONAL IMAGE DISPLAY

(75) Inventors: Hyun Ho Shin, Gyeonggi-do (KR); Hyung Ki Hong, Seoul (KR); Juun Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1061 days.

(21) Appl. No.: 11/602,500

(22) Filed: Nov. 21, 2006

(65) Prior Publication Data

US 2007/0291054 A1 Dec. 20, 2007

(30) Foreign Application Priority Data

Jun. 19, 2006 (KR) ..................... 10-2006-0054840

(51) Int. Cl.
*H04N 13/04* (2006.01)

(52) U.S. Cl. ............................ 348/51; 348/42; 348/52; 359/462; 359/464; 345/87; 345/88

(58) Field of Classification Search .................... 345/4, 345/6, 30, 32, 33, 48, 50, 55, 84, 87, 88; 348/42, 51, 52, 54, 59; 359/462, 463, 464
See application file for complete search history.

(56) References Cited

U.S. PATENT DOCUMENTS

| | | | | |
|---|---|---|---|---|
| 6,590,605 | B1 * | 7/2003 | Eichenlaub | 348/51 |
| 7,426,068 | B2 * | 9/2008 | Woodgate et al. | 359/237 |
| 2004/0178969 | A1 * | 9/2004 | Zhang et al. | 345/6 |
| 2005/0001787 | A1 | 1/2005 | Montgomery et al. | |

FOREIGN PATENT DOCUMENTS

| | | | |
|---|---|---|---|
| CN | 1534328 | A | 10/2004 |
| EP | 0752610 | A2 * | 1/1997 |
| WO | WO2004/092812 | A1 * | 10/2004 |

* cited by examiner

*Primary Examiner*—My-Chau T Tran
(74) *Attorney, Agent, or Firm*—Morgan, Lewis & Bockius LLP

(57) ABSTRACT

A three-dimensional image display device including a display device having odd-numbered sub-pixel columns for displaying a left image and even-numbered sub-pixel columns for displaying a right image; a first set of sub-pixels disposed in a same first horizontal line of adjacent odd-numbered sub-pixel columns have different colors; a second set of sub-pixels disposed in a same second horizontal line of adjacent even-numbered sub-pixels column have different colors; a screen positioned away from the display device for displaying the right and left images; and a slit barrier disposed between the display device and the screen for screening light from the display device.

15 Claims, 8 Drawing Sheets

THREE-DIMENSIONAL IMAGE DISPLAY

This application claims the benefit of the Korean Patent Application No. P06-0054840 filed on Jun. 19, 2006, which is hereby incorporated by reference in its entirety.

BACKGROUND OF THE INVENTION

1. Field of the Invention

Embodiments of the invention relate to a display device, and more particularly to a three-dimensional image display device. Although embodiments of the invention are suitable for a wide scope of applications, it is particularly suitable for that is adaptive for conversion between a two-dimensional plane image and a three-dimensional stereoscopic image while minimizing brightness deterioration.

2. Description of the Related Art

A three-dimensional image display device stereoscopically displays an image by using the perspective difference perceived by two eyes. The three-dimensional image display device is mainly classified by the type of method, such as a binocular method and an autostereoscopic method. In the binocular method, which uses binocular disparity, an the image is taken with a camera having a lens corresponding to the left eye perspective and another lens corresponding to the right eye perspective, and then displays a left image incident to the left eye and a right image incident to the right eye to realize a three-dimensional stereoscopic image. The stereoscopic image display device using the binocular method is classified as a slit barrier type or a lenticular lens type.

FIG. 1 a is diagram representing a three-dimensional image display device of the related art using a slit barrier. The method of using the slit barrier, as shown in FIG. 1, selectively screens the light irradiated from an image display surface of a display device 11 by use of a slit barrier 12 to separate the left and right images to realize the three-dimensional stereoscopic image. More specifically, the light of the left image L and the light of the right image R pass through the slit barrier 12 to display an image on a screen 13. This method has an advantage of being easily switchable between 3D/2D image modes because the slit barrier 12 can be realized with a liquid crystal display device that is turned-on when a three-dimensional stereoscopic image is displayed and then the slit barrier 12 can be eliminated by turning off the liquid crystal display device when a two-dimensional plane image is displayed. However, the slit barrier type has a disadvantage in that the brightness loss is great because the light transmitted through the slit barrier 12 is reduced by approximately 50% or less.

SUMMARY OF THE INVENTION

Accordingly, embodiments of the invention are directed to a three-dimensional image display device that substantially obviates one or more of the problems due to limitations and disadvantages of the related art.

An object of the present invention to provide a three-dimensional image display device and a pixel arranging method thereof that easily converts between a two-dimensional plane image and a three-dimensional stereoscopic image without decreased brightness.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a three-dimensional image display device includes a display device having odd-numbered sub-pixel columns for displaying a left image and even-numbered sub-pixel columns for displaying a right image, a first set of sub-pixels disposed in a same first horizontal line of adjacent odd-numbered sub-pixel columns have different colors, a second set of sub-pixels disposed in a same second horizontal line of adjacent even-numbered sub-pixels column have different colors, a screen positioned away from the display device for displaying the right and left images, and a slit barrier disposed between the display device and the screen for screening light from the display device.

In another aspect, a three-dimensional image display device includes a display device having odd-numbered sub-pixel columns for displaying a left image and even-numbered sub-pixel columns for displaying a right image, wherein a first set of red, green, blue and white sub-pixels are separately disposed in the odd-numbered sub-pixel columns, and a second set of red, green, blue and white sub-pixels are separately disposed in the even-numbered sub-pixel columns, a screen positioned away from the display device for displaying the right and left images, and a slit barrier disposed between the display device and the screen for screening light from the display device.

In another aspect, a three-dimensional image display device includes a first odd-numbered sub-pixel column and a second odd-numbered sub-pixel column for displaying a left pixel image, and a first even-numbered sub-pixel column and a second even-numbered sub-pixel column for displaying a right pixel image, wherein each of the left pixel image and the right pixel image contain a white sub-pixel, a screen positioned away from the display device for displaying the right and left images, and a slit barrier disposed between the display device and the screen for screening light from the display device It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention, in which.

DETAILED DESCRIPTION OF THE PREFERRED EMBODIMENTS

Figure 1:
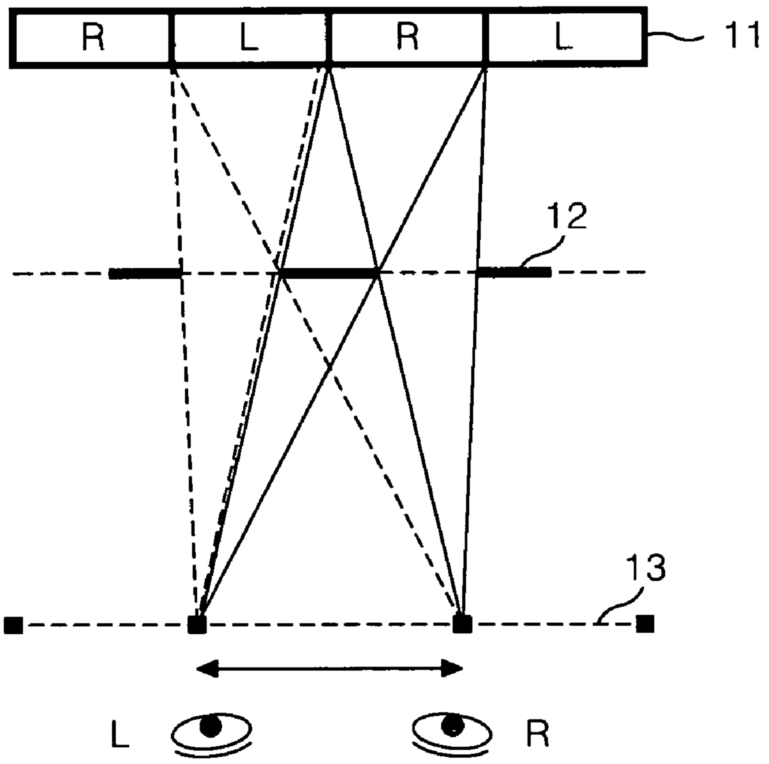
FIG. 1 RELATED ART
FIG. 1 is a diagram representing a three-dimensional image display device of the related art using a slit barrier.

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 2:
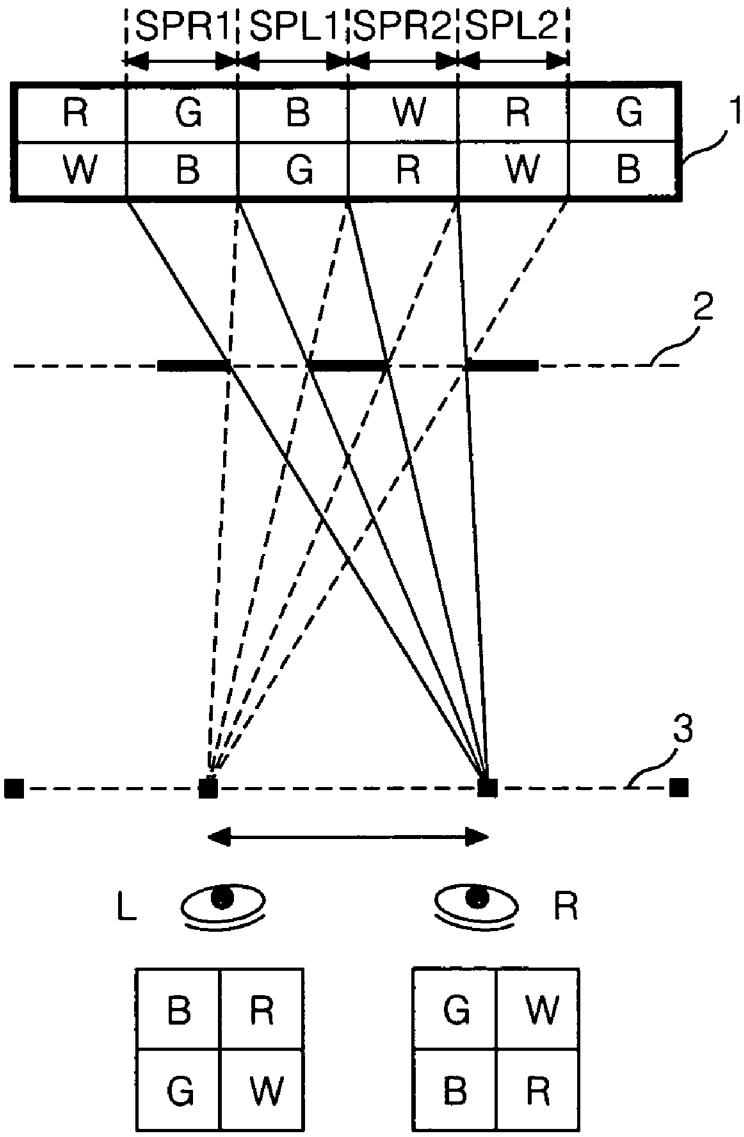
FIG. 2 is a diagram representing a three-dimensional image display device and a pixel arranging method thereof according to an embodiment of the invention.

FIG. 2 is a diagram representing a three-dimensional image display device and a pixel arranging method thereof according to an embodiment of the invention. Referring to FIG. 2, a three-dimensional display device according to an embodiment of the invention includes a display device 1 having a plurality of pixels arranged in a matrix shape and each pixel has red R, green G, blue B and white W sub-pixels; a slit barrier 2 disposed at a location which is positioned at a designated distance from the display device 1; and a screen 3 for displaying images that have passed through the slit barrier 2.

The display device 1 can be a flat panel display device, such as a liquid crystal display LCD, a field emission display FED, a plasma display panel PDP, or an organic light emitting diode. In the display device 1, data signal lines and scan signal lines are formed to cross each other to define sub-pixels. Active switch devices controlled by scan signals from signal lines are positioned at the crossing to switch data from the data lines to each of the sub-pixels. The display device 1 displays a two-dimensional plane image or a three-dimensional stereoscopic image, where left image data and right image data are provided, in accordance with an image source and a 2D/3D mode selection signal, which can be input from a user.

In the display device 1, the right image data of red R, green G, blue B, white W are separately displayed by sub-pixels that are disposed in even-numbered sub-pixel columns (or, an odd-numbered sub-pixel columns) SPR1 and SPR2. For example, the left image data of red R, green G, blue B, white W are separately displayed by the sub-pixels that are disposed in odd-numbered sub-pixel columns SPL1 and SPL2 while the right image data of red R, green G, blue B, white W are separately displayed by the sub-pixels that are disposed in even-numbered sub-pixel columns SPR and SPR2. The odd-numbered sub-pixel columns SPL1 and SPL2 and the even-numbered sub-pixel columns SPR1 and SPR2 are alternately disposed.

The slit barrier 2 is a device that screens the light from the display device 1 in response to an electrical control signal so as to screen light from the display device 1. For example, the slit barrier 2 can be a liquid crystal display device. The slit barrier 2 forms optical transmission slits, which each can be as wide as a sub-pixel, at a distance to provide separate respective progress paths for the light of the left image and the light of the right image which are emitted from the display device 1. The light of the sub-pixels for one pixel of an image pass through two slots of the slit barrier 2 to provide the images on the screen 3. More specifically, the light of two sub-pixels pass through a first slot of the slit barrier 2 and the light of two other sub-pixels pass through a second slot of the slit barrier 2 to a provide the light of one pixel. The left image and the right image, separately provided to the screen 1, are respectively perceived by the left eye and the right eye of the observer. Thus, the slit barrier 2 transmits all of the light from the sub-pixels for pixel of the left and right images from the two-dimensional plane image of the display device 1. Because the two-dimensional image display device includes the white W sub-pixel in each of the pixels, the brightness of the three-dimensional image is increased.

Figure 3:
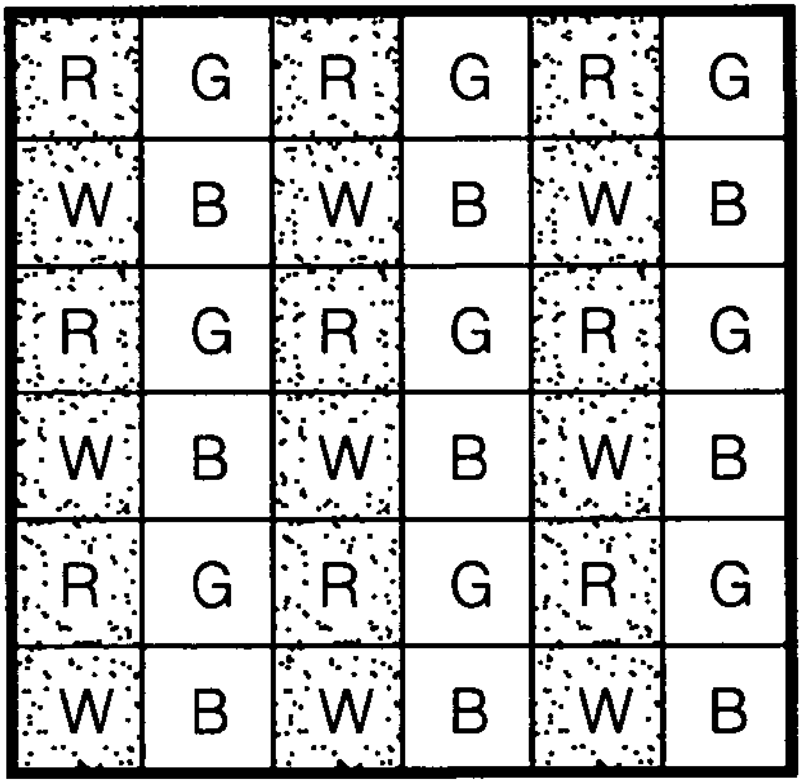
FIG. 3 is a diagram representing a pixel arrangement in which the left and right images have a color difference and a brightness difference.
Figure 4:
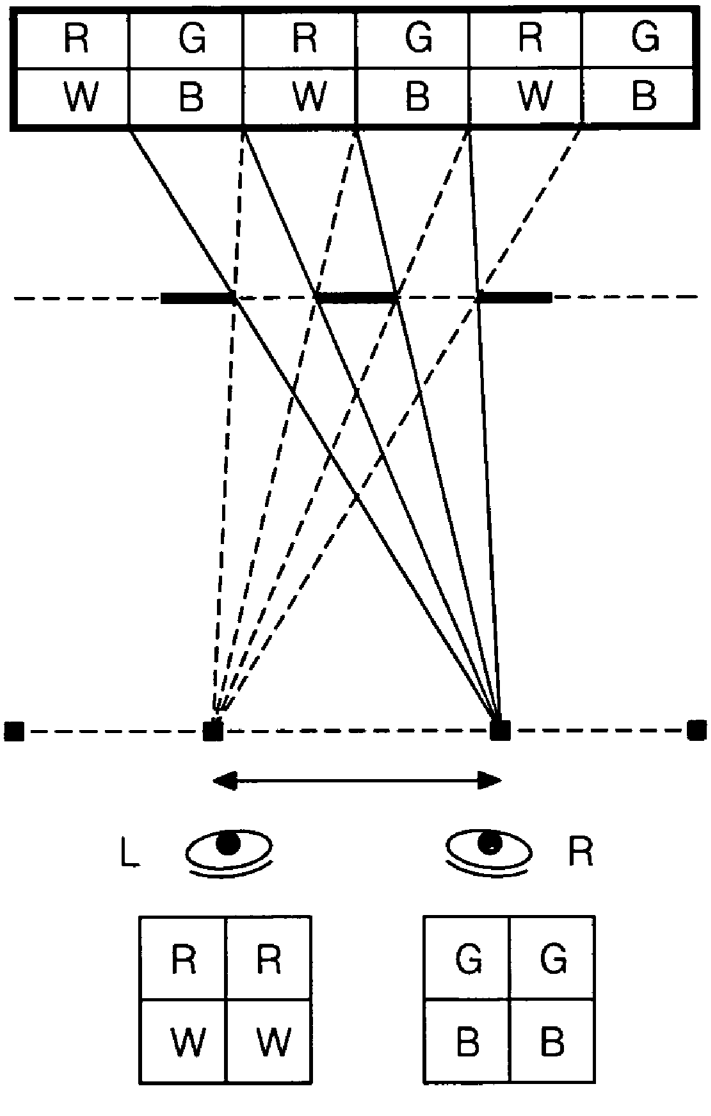
FIG. 4 is a diagram representing the perceived brightness and color for the left eye and the right eye shown in a sub-pixel arrangement of FIG. 3.

FIG. 3 is a diagram representing a pixel arrangement in which the left and right images have a color difference and a brightness difference. FIG. 4 is a diagram representing the perceived brightness and color for the left eye and the right eye shown in a sub-pixel arrangement of FIG. 3. If the color arrangement of odd-numbered sub-pixel columns is the same for all of the pixels such as R and W sequence down all of the odd-numbered sub-pixel columns and a G and B sequence in all of the even-numbered sub-pixel columns like shown in FIGS. 3 and 4, the colors R and W are only perceived by the right eye while the colors G and B are only perceived by the left eye. Accordingly, if the colors of the sub-pixels are arranged as shown in FIGS. 3 and 4, the brightness and color perceived by the left and right eyes are completely different. Such differences fatigue the observer and thwart an appropriate realization of a three-dimensional image.

FIGS. 5 to 8 are diagrams representing pixel arrangement methods of other embodiments which can be applied to the display device shown in FIG. 2. In embodiments of the invention, as shown in FIGS. 5 to 8, the color arrangement of the $(4k+1)^{th}$ (k is a positive integer) odd-numbered sub-pixel column is made to be a R and W repeating sequence and the color arrangement of the $(4k+3)^{th}$ odd-numbered sub-pixel column is made to be a B and G repeating sequence, thereby making the color arrangement different between adjacent odd-numbered sub-pixel columns. Further, the color arrangement of the $(4k+2)^{th}$ even-numbered sub-pixel column is made to be a G and B repeating sequence and the color arrangement of the $(4k+4)^{th}$ even-numbered sub-pixel column is made to be a W and R repeating sequence, thereby making the color arrangement different between the adjacent even-numbered sub-pixel columns. The data of the right image R is displayed in the adjacent even-numbered sub-pixel columns. The data of the left image L is displayed in the adjacent odd-numbered sub-pixel columns. If the color arrangement is made to be different between the odd-numbered sub-pixels and the color arrangement is made to be different between the even-numbered sub-pixels, the light of R, G, B and W sub-pixels is made incident to the right eye of the observer and the light of R, G, B and W sub-pixels is also made incident to the left eye of the observer, as shown in FIG. 2.

Figure 5:
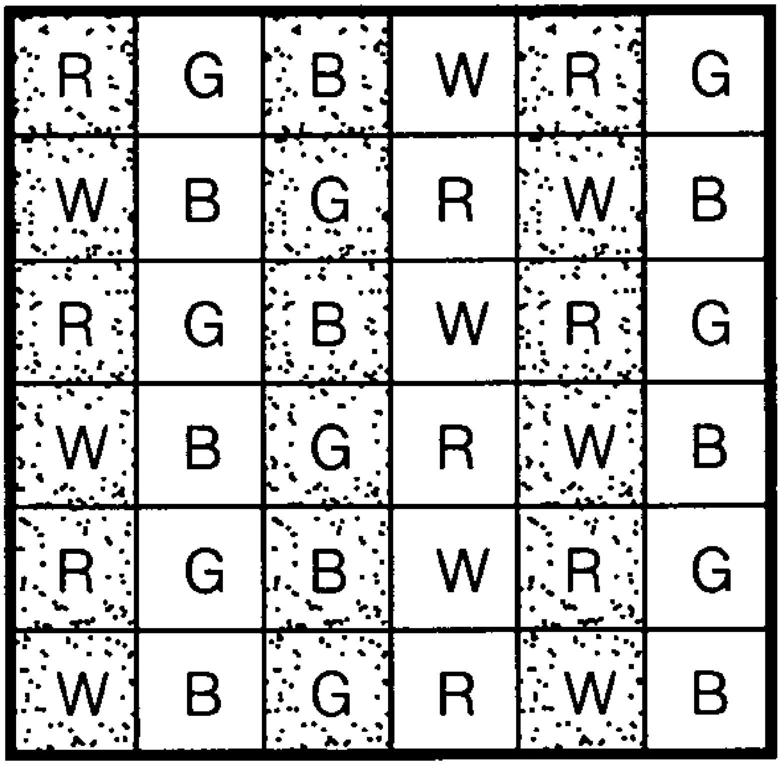
FIGS. 5 to 8 are diagrams representing pixel arrangement methods of other embodiments which can be applied to the display device shown in FIG. 2.
Figure 6:
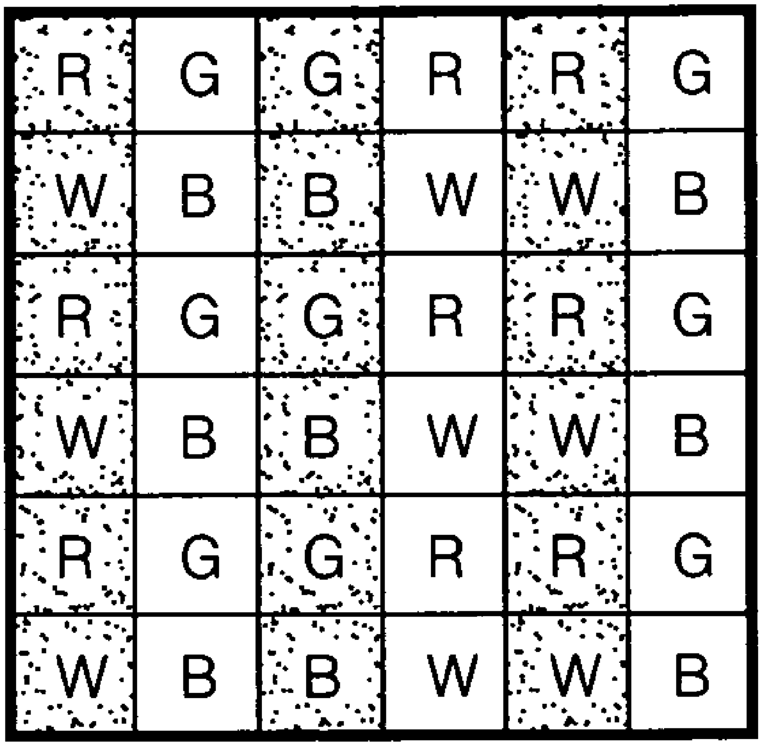
Figure 7:
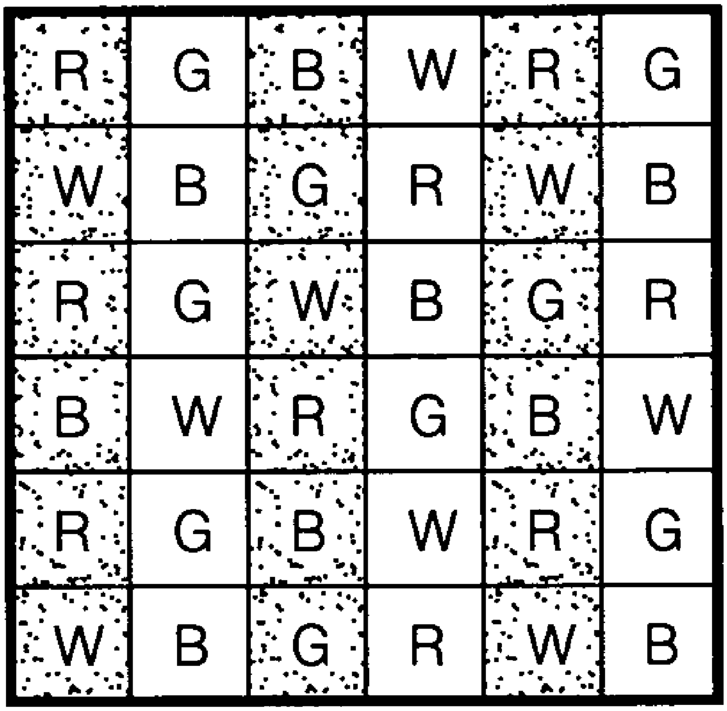
Figure 8:
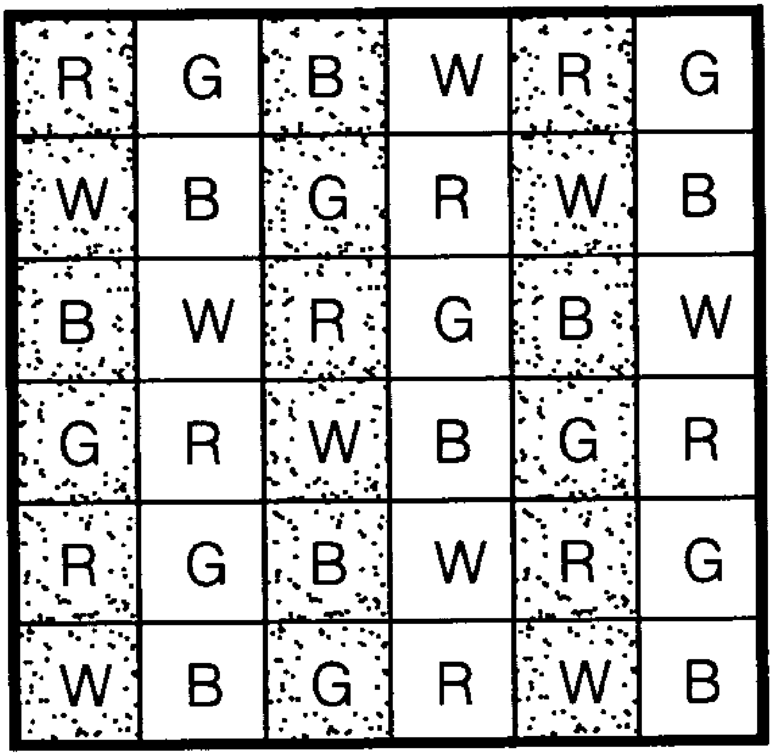

The arrangement of the sub-pixels of FIGS. 5 to 8 satisfies the condition that each of the colors is only in one of the sub-pixel columns that makeup a pixel for an image to prevent significant chromacity differences between the images incident to the left eye and the right eye. Thus a first set of sub-pixels disposed in a same first horizontal line of adjacent odd-numbered sub-pixel columns have a different color and a second set of sub-pixels disposed in a same second horizontal line of adjacent even-numbered sub-pixels column have a different color. FIGS. 5, 7, and 8 show examples of the sub-pixels arranged in the same horizontal line in adjacent odd-numbered sub-pixel columns have different colors from each other and that the sub-pixels arranged in another same horizontal line of adjacent even-numbered sub-pixel columns have different colors from each other. FIG. 6 shows an example that the sub-pixels arranged in the same horizontal line in the adjacent first even-numbered sub-pixel column and second odd-numbered sub-pixel column have the same color, and the sub-pixels arranged in the same horizontal line in the first odd-numbered sub-pixel column and the second even-numbered sub-pixel column, which are separated by the first even-numbered sub-pixel column and the second odd-numbered sub-pixel column, have the same color.

The three-dimensional image display device according to embodiments of the invention use the slit barrier method such that conversion between the two-dimensional plane image and the three-dimensional stereoscopic image can be made easy. In addition, a single white sub-pixel is in the sub-pixels of the left image and another single white sub-pixels is in the sub-pixels of the right image, thereby increasing the brightness of the three-dimensional image. Further, embodiments of the invention makes the color arrangement different between the odd-numbered sub-pixel columns and between the even-numbered sub-pixel columns to make the light of R, Q B and W colors incident to both the left eye and right eye of the observer, thereby increasing the uniformity of brightness and minimizing chromaticity differences for both the left eye and the right eye.

Although the invention has been explained in reference to the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A three-dimensional image display device, comprising:

a display device having odd-numbered sub-pixel columns for displaying a left image and even-numbered sub-pixel columns for displaying a right image;

a first set of sub-pixels disposed in a same first horizontal line of adjacent odd-numbered sub-pixel columns have different colors;

a second set of sub-pixels disposed in a same second horizontal line of adjacent even-numbered sub-pixels column have different colors;

a screen positioned away from the display device for displaying the right and left images; and a slit barrier disposed between the display device and the screen for screening light from the display device, wherein the $(4k+1)^{th}$ (k is a positive integer) odd-numbered sub-pixel column includes repeated sequence red and white sub-pixels; the $(4k+3)^{th}$ odd-numbered sub-pixel column includes repeated sequence blue and green sub-pixels; the $(4k+2)^{th}$ even-numbered sub-pixel column includes repeated sequence green and blue sub-pixels; and the $(4k+4)^{th}$ even-numbered sub-pixel column includes repeated sequence white and red sub-pixels.

2. The three-dimensional image display device according to claim 1, wherein the sub-pixels disposed in the same horizontal line in adjacent odd-numbered and even-numbered sub-pixel columns have different colors from each other.

3. The three-dimensional image display device according to claim 1, wherein the slit barrier is electrically controlled.

4. The three-dimensional image display device according to claim 3, wherein the slit barrier is a liquid crystal display device.

5. A three-dimensional image display device, comprising:

a display device having odd-numbered sub-pixel columns for displaying a left image and even-numbered sub-pixel columns for displaying a right image, wherein a first set of red, green, blue and white sub-pixels are separately disposed in the odd-numbered sub-pixel columns, and a second set of red, green, blue and white sub-pixels are separately disposed in the even-numbered sub-pixel columns;

a screen positioned away from the display device for displaying the right and left images;

a slit barrier disposed between the display device and the screen for screening light from the display device; and wherein the $(4k+1)^{th}$ (k is a positive integer) odd-numbered sub-pixel column includes repeated sequence red and white sub-pixels; the $(4k+3)^{th}$ odd-numbered sub-pixel column includes repeated sequence blue and green sub-pixels; the $(4k+2)^{th}$ even-numbered sub-pixel column includes repeated sequence green and blue sub-pixels; and the $(4k+4)^{th}$ even-numbered sub-pixel column includes repeated sequence white and red sub-pixels.

6. The three-dimensional image display device according to claim 5, wherein the sub-pixels disposed in the same horizontal line in adjacent odd-numbered and even-numbered sub-pixel columns have different colors from each other.

7. The three-dimensional image display device according to claim 5, wherein the sub-pixels disposed in adjacent odd-numbered sub-pixel columns have a same color, and the sub-pixels disposed in adjacent even-numbered sub-pixel columns have a same color.

8. The three-dimensional image display device according to claim 5, wherein the slit barrier is electrically controlled.

9. The three-dimensional image display device according to claim 8, wherein the slit barrier is a liquid crystal display device.

10. A three-dimensional image display device, comprising:

a display device having a first odd-numbered sub-pixel column and a second odd-numbered sub-pixel column for displaying a left pixel image, and a first even-numbered sub-pixel column and a second even-numbered sub-pixel column for displaying a right pixel image, wherein each of the left pixel image and the right pixel image contain a white sub-pixel;

a screen positioned away from the display device for displaying the right and left images;

a slit barrier disposed between the display device and the screen for screening light from the display device; and wherein the $(4k+1)^{th}$ (k is a positive integer) odd-numbered sub-pixel column includes repeated sequence red and white sub-pixels; the $(4k+3)^{th}$ odd-numbered sub-pixel column includes repeated sequence blue and green sub-pixels; the $(4k+2)^{th}$ even-numbered sub-pixel column includes repeated sequence green and blue sub-pixels; and the $(4k+4)^{th}$ even-numbered sub-pixel column includes repeated sequence white and red sub-pixels.

11. The three-dimensional image display device according to claim 10, wherein the first odd-numbered sub-pixel column includes red and white sub-pixels; the second odd-numbered sub-pixel column includes blue and green sub-pixels; the first even-numbered sub-pixel column includes the green and blue sub-pixels; and the second even-numbered sub-pixel column includes white and red sub-pixels.

12. The three-dimensional image display device according to claim 10, wherein the sub-pixels disposed in the same horizontal line in adjacent odd-numbered and even-numbered sub-pixel columns have different colors.

13. The three-dimensional image display device according to claim 10, wherein the sub-pixels disposed in adjacent odd-numbered sub-pixel columns have a same color, and the sub-pixels disposed in adjacent even-numbered sub-pixel columns have a same color.

14. The three-dimensional image display device according to claim 10, wherein the slit barrier is electrically controlled.

15. The three-dimensional image display device according to claim 14, wherein the slit barrier is a liquid crystal display device.

* * * * *